United States Patent [19]

Edelstein et al.

[11] Patent Number: 5,017,806
[45] Date of Patent: May 21, 1991

[54] BROADLY TUNABLE HIGH REPETITION RATE FEMTOSECOND OPTICAL PARAMETRIC OSCILLATOR

[75] Inventors: Daniel C. Edelstein, White Plains; Elliot S. Wachman; Chung L. Tang, both of Ithaca, all of N.Y.

[73] Assignee: Cornell Research Foundation, Inc., Ithaca, N.Y.

[21] Appl. No.: 507,444

[22] Filed: Apr. 11, 1990

[51] Int. Cl.$^5$ ............................................. H03F 7/00
[52] U.S. Cl. ...................................... 307/428; 372/20; 372/21; 372/72; 372/94
[58] Field of Search ...................... 372/94, 100, 21, 22, 372/69, 72, 20, 25; 307/427, 428, 424, 425

[56] References Cited

U.S. PATENT DOCUMENTS

| | | | |
|---|---|---|---|
| 3,949,323 | 4/1976 | Bierlein | 330/4.3 |
| 4,231,838 | 11/1980 | Gier | 156/600 |
| 4,305,778 | 12/1981 | Gier | 156/623 R |
| 4,400,814 | 8/1983 | Fork et al. | 372/94 |
| 4,517,675 | 5/1985 | Mourou et al. | 372/53 |
| 4,612,641 | 9/1986 | Corkum | 372/25 |
| 4,641,312 | 2/1987 | Schafer et al. | 372/25 |
| 4,646,308 | 2/1987 | Kafka et al. | 372/25 |
| 4,760,577 | 7/1988 | Aoshima | 372/25 |
| 4,815,080 | 3/1989 | Chesnoy et al. | 372/30 |
| 4,879,722 | 11/1989 | Dixon et al. | 382/21 |
| 4,933,947 | 6/1990 | Anthon et al. | 372/34 |

OTHER PUBLICATIONS

"Stabilization of a Femtosecond Dye Laser Synchronously Pumped by a Frequency-Doubled mode-locked YAG laser" Chesnoy and Fini Oct. 1986, vol. 11, No. 10 *Optics Letters* pp. 635-637.
"Cavity-Length Detuning Effects and Stabilization of a Synchronously Pumped Femtosecond Linear Dye Laser" Dawson and Maxson, Feb. 1988, vol. 13, No. 2, *Optics Letters* pp. 126-128.
"Negative Dispersion Using Pairs of Prisms", Fork et al, May 1984, vol. 9, No. 5, *Optics Letters*, pp. 150-152.
"Generation of Optical Pulses as short as 27 Femtoseconds Directly *From a Laser Balancing Self-Phae Modulation*, Group-Velocity Dispersion, Saturable Absorptin, and Saturable Gain", Valdmanis Mar. 1985, vol. 10, No. 3, *Optics Letters* pp. 131-133.
"Generation of Optical Pulses Shorter than 0.2 psec by Colliding Pulse Mode Locking", Fork et al, May 1981, *Appl. Phys. Lett.* 38 (9) pp. 671-672.
"Nonlinear Optical Effects: An Optical Power Limiter" Siegman Applied Optics, vol. 1, p. 739 (1962).
"Parametric Amplification in Spatially Extended Media and Application to the Design of Tuneable Oscillators at Optical Frequencies" Krol, *Physical Review*, vol. 127, No. 4, Aug. 1962 pp. 1207-1211.
"Tunable Coherent Parametric Oscillation in LiNbO$_3$ at Optical Frequencies" Giordamine et al Physical Review Letters, vol. 14, No. 24, Jun. 1965 pp. 973-976.
"Theory of Optical Parameric Oscillation Internal to the Laser Cavity" Oshman et al, IEEE Journal of Quantum Electronics, vol. QE-4, No. 8, Aug. 1968 pp. 491-503.
"Experimental Observation of and Comments on Optical Parametric Oscillation Internal to the Laser Cavity", Smith et al, *Journal of Applied Physics*, vol. 41, No. 8, Jul. 1970 pp. 3401-3408.
"Parametric Light Amplification and Oscillation in KDP with Mode-Locked Pump" Burneika, IEEE J. Quantum Electron. QE-8, (1972) p. 574.

(List continued on next page.)

Primary Examiner—Frank Gonzalez
Assistant Examiner—Galen J. Hansen
Attorney, Agent, or Firm—Jones, Tullar & Cooper

[57] ABSTRACT

A tunable, singley-resonant optical parametric oscillator provides femtosecond light pulses in the infrared wavelength band. The oscillator includes an internally mounted thin crystal of KTiOPO$_4$ which is synchronously pumped by femtosecond pulses from a colliding-pulse passively mode-locked dye laser. Rotation of the crystal varies the wavelength of the oscillator. Prisms within the oscillator cavity control group velocity dispersion to limit pulse width, and the oscillator as stabilized by a feedback network which varies the length of the cavity in response to spectral changes.

22 Claims, 5 Drawing Sheets

OTHER PUBLICATIONS

"Analytic Expressions forUltrashort Pulse Genreation in Mode-Locked Optical Parametric Oscilaltors" Becker et al, *J. of Applied Physics* vol. 45, No. 9, Sep. 1974, pp. 3996.

"Optimal Focusing in a Singly Resonant Optical Parametric Oscillator" Fischer et al, Quantum Electron. 7(12) Dec. 1977 pp. 1455–1458.

"The Effects of Focusing on Parametric Oscillation" Guha et al IEEE Journal of Quantum Electronics, vol. QE-18, No. 5, May 1982 pp. 907–912.

"Generation of Subpicosecond Continuously Frequency-Tunable Infrared Pulses" Bareika et al, Sov. J. Quantum Electron. 13 (11), Nov. 1983, pp. 1507–1510.

"Continuous Parametric Geenration of Picosecond Light Pulses" Piskarskas et al, Sov. J. Quantum Electron. 18(2) Feb. 1988 p. 155.

"Synchronously Pumped Optical Parametric Oscillation in Beta-Barium Borate", Bromley et al, Optics Communications, vol. 67, No. 4, Jul. 1988, pp. 316–320.

"Effect of Double Refraction on Type II Phase Matched Second Harmonic Generation" Mehendale et al, Optics Communications, vol. 68, No. 4, Oct. 1988, pp. 301–304.

"Synchronouly Pumped Optical Parametric Oscillation in KTP" Bromley et al, Optics Communications, vol. 70, No. 4, Mar. 1989 pp. 350–354.

"Generation of Synchronized Ultraviolet and Red Femtosecond Pulses by Intracavity Frequency Doubling", Focht et al, IEEE Journal of *Quantum Electronics*, vol. 24, No. 2, Feb. 1988, pp. 431–434.

"Femtosecond Ultraviolet Pulse Generation in $\beta$-BaB$_2$O$_4$" Edelstein et al, Appl. Phys. Lett. 52 (6) Jun. 1988, pp. 2211–2213.

"Theory of Intracavity Frequency Doubling in Passively Mode-Locked Femtosecond Lasers" Zhang et al, IEEE Journal of Quantum Electronics, vol. 24, No. 9, Sep. 1988, pp. 1877–1883.

"Tunable Subpicosecond Infrared Pulse Generation to 4 $\mu$m" Moore et al, Optics Letters vol. 12, No. 7, Jul. 1987 pp. 480–482.

"Generation of High-Peak-Power Tunable Infrared Femtosecond Pulses in an Organic Crystal: Application to Time Resolution of Weak Infrated Signals", Ledoux et al *J. Optical Soc. of America* vol. 4, pp. 987–997, Jun. 1987.

"Tunable Femtosecond Radiation in the Mid-Infrared for Time-Resolved Absorption in Semiconductors", Jedju et al, *Applied Optics*, vol. 27, No. 3, Feb. 1988 pp. 615–618.

"Suypicosecond Time-Resolved Infrared Spectral Photography" Glownia et al, J. Optical Society America B vol. 4, p. 1061 (1986).

"Generation and Kilohertz-rate Amplification of Femtosecond Optical Pulses around 800 nm", Knox, *J. Optical Society of America*, vol. 4, 1771, Nov. 1987.

FIG. 1

BROADLY TUNABLE HIGH REPETITION RATE FEMTOSECOND OPTICAL PARAMETRIC OSCILLATOR

This invention was made with Government support under Grant No. F49620-87-C-0044, awarded by the Joint Services Electronics Program and under Grant No. 87-15587, awarded by the National Science Foundation. The Government has certain rights in the invention.

BACKGROUND OF THE INVENTION

The present invention relates, in general, to the production of ultra-short light pulses which are tunable in the infrared, and particularly to a synchronously pumped optical parametric oscillator which provides femtosecond output light pulses at a high repetition rate, the light being in the infrared wavelength band and being potentially tunable in a range of from about 0.72 to about 4.5 micrometers.

Laser pulses in the femtosecond time domain; i.e., pulses having widths of from $10^{-15}$ to $10^{-13}$ seconds, have become important tools for studying extremely short-duration events such as chemical reactions, for by directing femtosecond pulses at reacting chemicals, for example, researchers can capture spectroscopic information about the structure and behavior of short-lived molecular intermediates of the reactions. Femtosecond lasers are also important for studying the dynamics and the ultimate limits of high-speed semiconductor electronic and optical devices. However, numerous ultrafast phenomena have been inaccessible to direct optical study due to a lack of light sources having appropriate wavelengths or having other suitable characteristics such as tunability or a high repetition rate.

A particularly interesting region of optical study lies in the near- to mid-infrared, where, for example, it is possible to study carrier dynamics in most families of semiconductors as well as to do time-domain vibrational spectroscopy in many molecules. Tunable subpicosecond pulses in various parts of the near- to mid-infrared region have been generated by a number of methods in the past, but such methods have either required amplification of a femtosecond laser followed by supercontinuum generation and seeded parametric amplification, or in one case has required a transient breakup of picosecond pulses in a parametric oscillator. However, for many experiments, especially in condensed matter, the low pulse repetition rates of all of these methods, which generally have been in the range of about 10 Hertz, although some have been as high as 8 kiloHertz, as well as the expense associated with the amplified systems, has created numerous problems.

In order to meet present needs, a tunable source of optical pulses in the near to mid infrared wavelength range is required which will permit changes in the wavelength of the light produced while maintaining a high repetition pulse rate. The narrowest possible pulse width in the femtosecond range is needed, with the narrow pulse width being maintained over a wide range of wavelengths.

SUMMARY OF THE INVENTION

The present invention is directed to a technique for producing femtosecond pulses at different wavelengths through the use of the high peak intensities (greater than $10^{10}$ watts per square centimeter) attainable at an intracavity focus of a colliding-pulse passively mode-locked dye laser (CPM). It has been found that at this intensity level, 3-wave mixing in short lengths of typical non-linear optical crystals becomes reasonably efficient while preserving time coherence, repetition rate, beam spatial quality, and short pulse widths. It has been found that frequency conversion using this mixing technique is an inexpensive and straightforward modification to an existing CPM laser. Although this technique has been used to produce ultraviolet pulses through intracavity frequency doubling in ultrathin beta barium borate crystals, it has not previously been possible to obtain high repetition rate femtosecond pulses in the near to mid infrared region.

The present invention provides femtosecond pulses in the infrared through the provision of an optical parametric oscillator (OPO) which is synchronously pumped by intracavity CPM pulses. This oscillator, which is believed to be the first to be synchronously pumped by femtosecond pulses, produces a very broadly tunable infrared femtosecond light source without the need for amplification. In accordance with the present invention, a CPM ring dye laser includes a thin crystal of $KTiOPO_4$ (hereinafter KTP) mounted internally in the CPM cavity. The crystal is located at the CPM focus and is mounted for rotation about a horizontal axis which is perpendicular to the laser beam propagating in the CPM. The crystal is also located in the cavity of an optical parametric ring oscillator (OPO), and is pumped by the CPM pulses to produce signal and idler beams, the signal beams being directed into the OPO cavity. Rotation of the KTP crystal about its axis and proper selection of the reflectivity of the mirrors in the OPO cavity result in a variable wavelength signal beam in the near to mid infrared range. To limit the pulse width of the OPO, prisms are incorporated in the OPO cavity to control group velocity dispersion in the pulses. In addition, a feedback circuit is provided to actively modify the length of the OPO cavity, as by mounting one of the OPO flat mirrors on a piezoelectric transducer. In this feedback arrangement, the spectrum of the pulses is monitored, as by way of two photodiodes sensing the opposite sides of a spectral peak, and their difference signal is compared to a predetermined bias voltage to produce an error signal for adjusting the length of the cavity to stabilize the system.

In summary, the femtosecond optical parametric oscillator of the present invention provides a continuous wave, singly-resonant, mode-locked optical parametric oscillator through the use of a KTP crystal which is pumped by a femtosecond dye laser. An oscillator cavity is provided for resonating the signal wave that is produced by the crystal, with the oscillator cavity being matched in length to the dye laser cavity for synchronous pumping. Dispersion compensation and feedback controlled oscillator cavity length result in stable femtosecond pulses at a high repetition rate. With suitable OPO mirrors, the present device is capable of producing pulses from 0.72 to 4.5 micrometers wavelength at a $10^8$ Hz repetition rate with milliwatt power outputs. In the 0.82–0.92 micrometer range, pulses of 105 fs have been obtained.

BRIEF DESCRIPTION OF THE DRAWINGS

The foregoing and additional objects, features and advantages of the present invention will become apparent to those of skill in the art from a consideration of the following detailed description of a preferred embodiment, taken in conjunction with the accompanying drawings, in which:

FIG. 1 is a schematic diagram of the femtosecond optical parametric oscillator of the present invention;

DESCRIPTION OF PREFERRED EMBODIMENTS

Figure 1:
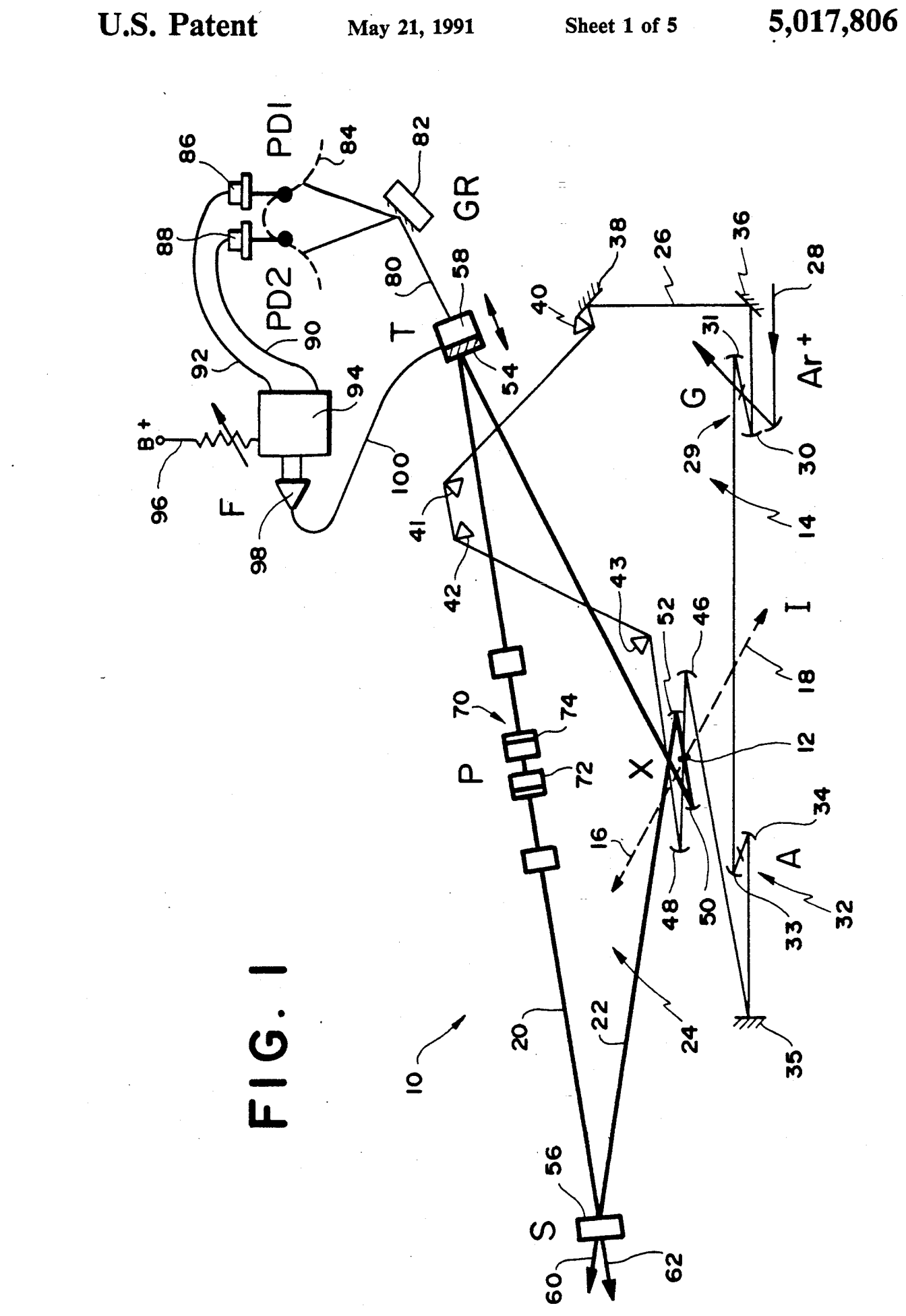
Figure 2A:
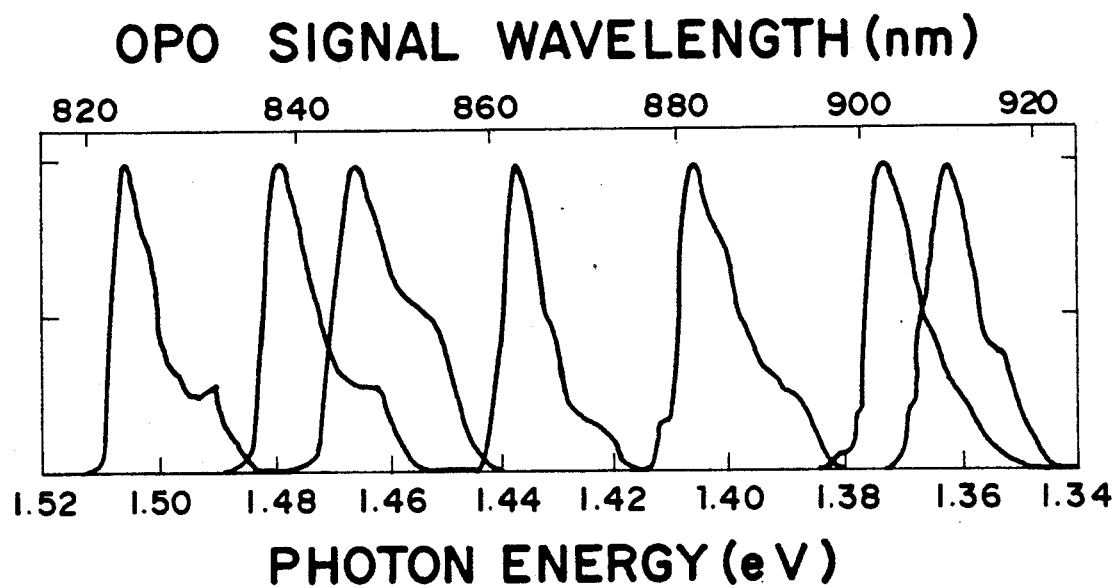
FIG. 2a illustrates the normalized spectra for the signal as the oscillator of FIG. 1 is tuned across the reflectivity range of its mirrors.

Turning now to a more detailed consideration of a preferred embodiment of the present invention, there is illustrated in FIG. 1 a continuous wave, femtosecond optical parametric oscillator 10 incorporating a thin KTP crystal 12 located in the cavity of a CPM dye laser generally indicated at 14. The crystal 12 is pumped by the CPM laser 14 and produces a pair of idler beams 16 and 18 as well as a pair of signal waves 20 and 22. In the illustrated embodiment, the signal waves are directed into, and propagate in opposite directions in an optical parameter oscillator cavity generally indicated at 24.

The CPM dye laser pump 14 is a rhodamine 6G laser having a cavity indicated by the path 26. This laser is pumped by an argon source indicated at 28 supplied to a gain jet G generally indicated at 29 and defined by focusing mirrors 30 and 31. The path 26 also includes an absorber jet A generally indicated at 32 and defined by curved focusing mirrors 33 and 34, as well as flat mirrors 35 and 36 at opposite ends of the leg of laser 14 containing the gain and absorber jets. Mirror 36 directs light from the gain jet to a third flat mirror 38, through four prisms 40 to 43 to a pair of curved focusing mirrors 46 and 48 which direct light though the CPM focus region to mirror 35 and back to the gain and absorber jets. It is noted that the CPM 14 does not include an output coupler, but instead utilizes high reflectance mirrors. The intracavity focus mirrors 46 and 48 are also high reflectors and preferably have a radius of $R=20$ cm. The prism pairs 40, 41 and 42, 43 are separated from each other to compensate for group velocity dispersion caused by the thin KTP crystal.

The crystal 12 may be a hydrothermally grown KTP crystal 1.4 mm thick and cut for type II (o→e+o) 1 degree internal noncolinear phase matching at normal incidence. The crystal is coated with an antireflection coating which may be a single layer of $MgF_2$ on both sides, resulting in an overall transmission loss of less than 0.5% at 0.62 micrometers and about 3% at 0.850 micrometers. As indicated above, the KTP crystal is mounted at the CPM focus between mirrors 46 and 48 and is rotatable about a horizontal axis perpendicular to the CPM beam.

The OPO ring cavity 24 is formed by two curved focusing mirrors 50 and 52 positioned on opposite sides of the crystal 12 and two flat mirrors 54 and 56. These mirrors 50, 52, 54 and 56 define the path followed by the counterrotating beams 20 and 22 propagating in the cavity and thus define the OPO cavity. The curved mirrors 50 and 52 may each have a radius of 10 cm to provide the required focus for the cavity 24 at the crystal 12. One of the flat mirrors, such as mirror 54, is mounted on a piezoelectric transducer 58 for fine adjustment of the length of the OPO cavity. Three of the four mirrors are highly reflective at the wavelength range of operation for the OPO; for example, mirrors 50, 52 and 54 may be highly reflective at wavelengths from 0.82 to 0.92 micrometers, while the fourth mirror, for example, mirror 56, is also reflective at these wavelengths but is a 1% output coupler for the signal beams 20 and 22 to provide output beams 60 and 62.

The crystal 12 acts as a frequency converter, and thus responds to the input energy from the pumping beam of the CPM laser to produce output beams at two longer wavelengths, one represented by the signal beams 20 and 22 and the other represented by the idler beams 16 and 18. The signal or the idler beams are made to resonant within the cavity of the OPO 24; in the illustrated embodiment, it is the signal beam that is so resonated. The idler beams 16 and 18 exit the OPO and are not resonated. The OPO oscillation of the signal beam occurs in two counter propagating beams 20 and 22, with each signal pulse being pumped once per round trip in the cavity by a corresponding CPM pumping pulse. The OPO small signal gain is about 5% per pass and the total loss is 4% so that the signal wave gradually builds up. As this occurs, the CPM is depleted and clamped at the point where gain equals loss in the OPO. At this point, the CPM intracavity power is decreased by 10% and this acts as an optical limiter so that power fluctuations in the CPM are reduced. These fluctuations appear, however, on the OPO output so that at this point of CPM depletion any increase in the pumping of the CPM will be channeled directly to the OPO. The measured value of the RMS power fluctuations from 10 Hz to 10 kHz on the CPM is about 1.5% with the OPO blocked. However, with the OPO oscillating, the fluctuations are reduced to about 0.3%. The RMS noise on the OPO output is measured at about 5%, which is suitable for highly resolved ultrafast measurements using typical data acquisition methods.

In the present device it is necessary to have noncolinear phase matching in the crystal, but the angle between the pump and the signal beams cannot exceed about 2° (internal to the crystal) if full tunability is to be obtained. Less than 1° internal noncolinearity is obtained in the present invention by using cut focusing mirrors 50 and 52 placed on opposite sides of the crystal, as shown in FIG. 1. The OPO focal length is chosen to have a ratio of signal to pump confocal parameters of less than 1.

The operation of the CPM 14 is perturbed by the introduction of the KTP crystal in its cavity, probably because the high nonlinear refractive index of KTP allows excessive selfphase modulation of red pulses. This pertubation results in increased nonlinear chirp which cannot be compensated by the prisms in the CPM cavity, with the result that the CPM pulses are broadened by the presence of the crystal. For this reason it is necessary to reduce the CPM focusing in the crystal by utilizing a radius of 20 cm for mirrors 46 and 48, rather than using 10 cm radii which would produce optimal focusing. The CPM pulses are always more than 170 femtoseconds as a result. As the crystal is translated away from the focus of the CPM, the CPM pulse widths approach normal values, but the parametric gain is reduced to below threshold for the OPO 24.

The average power in each of the counterrotating signal output beams 20 and 22 in OPO 24 was found to be 2 mW in a test of the system as described above. It was also found that 6 mW was lost at the surfaces of crystal 12. Thus, in total, more than $4 \times 10^8$ photons are generated in each signal and idler pulse, which is about ¼ the amount of photons in the output of a typical CPM. All of the idler energy exits in the two idler beams 16 and 18 illustrated in FIG. 1. The signal beam has a Gaussian profile with a spot diameter of 1.7 mm ($1/e^2$) and a full far-field divergence of 0.7 mrad. This is within 10% of the diffraction limit, so very small focal spot sizes are available.

Figure 2B:
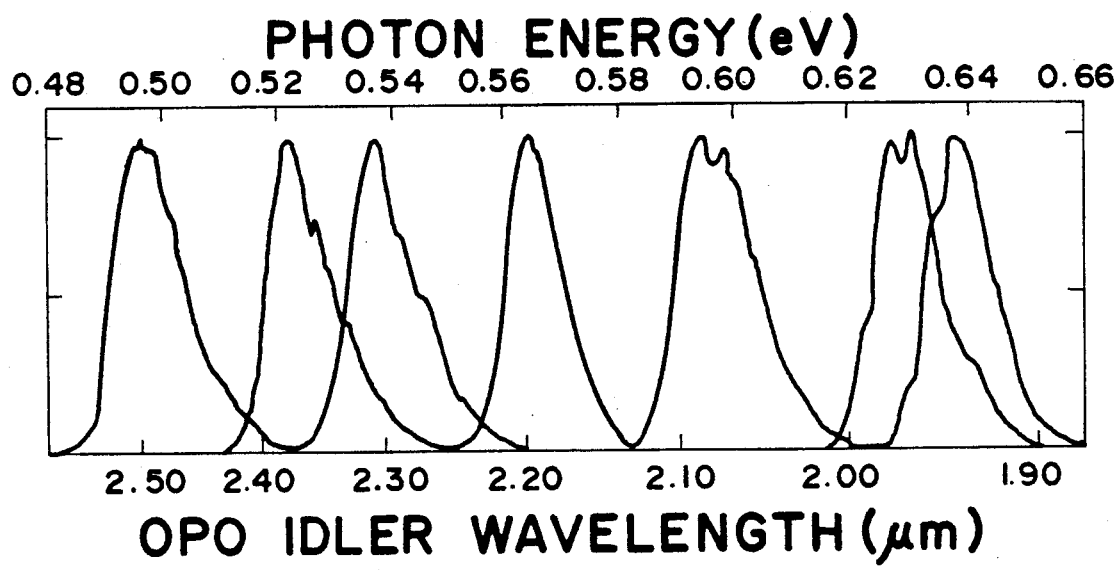
FIG. 2b is a graphical illustration of normalized spectra for the idler as the oscillator of FIG. 1 is tuned across the complete reflectivity range of its mirrors.

FIGS. 2a and 2b illustrate pairs of spectra for the signal and idler beams, respectively, as the optical parametric oscillator is tuned across the complete reflectivity range of its mirrors. The signal tuning rate is approximately 10 nm per degree of crystal rotation. The scales of the two graphs are arranged so that photon energies directly above and below each other in FIGS. 2a and 2b add up to the pump energy of 2.00 eV. Thus, for example, at the left hand edge of the scales the photon energy for the graph of FIG. 2a is given as 1.52 eV, while the photon energy for the graph of FIG. 2b is 0.48 eV.

Initially, it was found that the pulse width reduction from the pump 14 to the oscillator 24 which occurs in many synchronously pumped systems was not present in the present system. Furthermore, the observed time-bandwidth product of 0.6 to 0.8 for the signal pulses exceeded the transform limit. However, it was found that the pulse formation in the OPO 24 was limited by group velocity dispersion broadening in the crystal 12, for the signal pulses broadened in every pass until they were nearly the same width as the pump pulses. In addition to dispersion broadening in the crystal, group velocity walk away between the signal and the pump accounted for additional broadening. Since there is no gain in the OPO outside the pump pulse, the OPO pulse width is fixed, although energy can be lost as the pulse exceeds the temporal window provided by the pump pulse. The effect of group velocity dispersion is further illustrated by tuning the OPO as a function of cavity length, for as the length is changed, the signal wavelength shifts to thereby adjust the group velocity in the crystal 12 to maintain a constant cavity round trip time. The oscillation range under tuning by adjusting the length of the cavity alone was found to be more than 250 angstroms, thereby indicating that the gain bandwidth was not a limiting factor in the pulse formation.

In order to compensate for the pulse widening due to group velocity dispersion, a four prism sequence generally indicated at 70 is added to the OPO cavity. The prism sequence includes first and second pairs of prisms 72 and 74. The prisms are equilateral, uncoated SF-14 flint glass and are set at minimum deviation, approximately Brewster's angle in the near infrared, with the whole assembly mounted in a vertical plane for p-polarization of the signal wave. The prism pairs are separated by about 20 cm in the cavity path, and by varying the amount of prism glass in the beam path, the net cavity group velocity dispersion may be adjusted through zero easily for any choice of oscillation wavelength.

Figure 3:
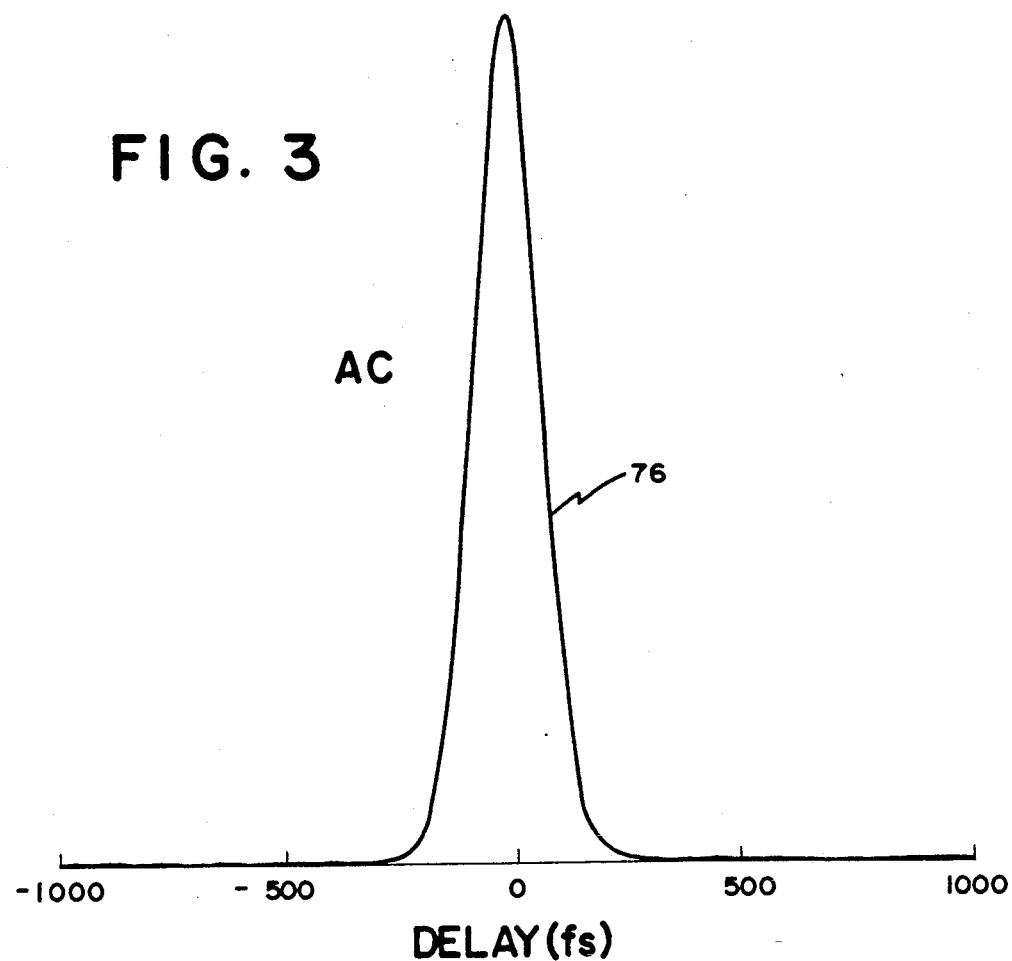
FIG. 3 is a graphical illustration of autocorrelation data representative of the signal branch of the oscillator of FIG. 1.
Figure 4:
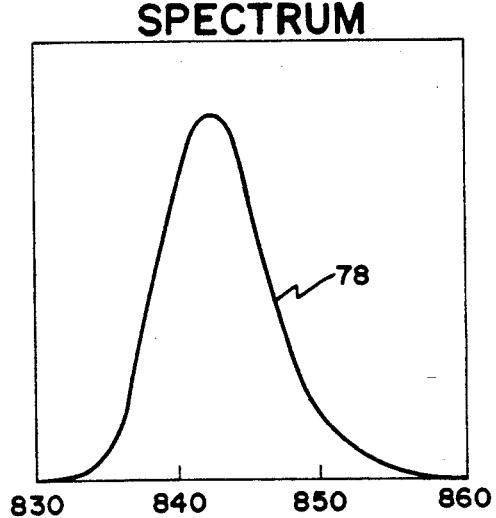
FIG. 4 is a graphical illustration of the spectrum of wavelengths in the OPO of FIG. 1 corresponding to the autocorrelation of FIG. 3.
Figure 5:
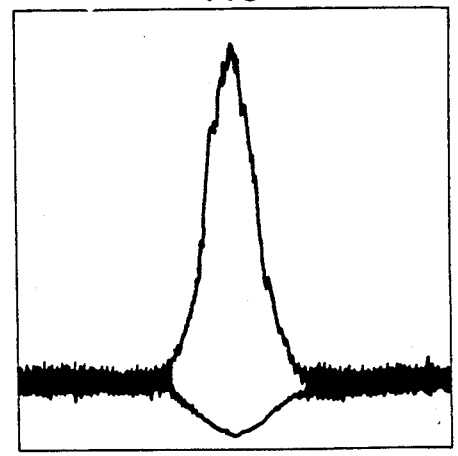
FIG. 5 illustrates an interferometric autocorrelation envelope produced at a signal frequency of 0.84 micrometers.

FIG. 3 displays an autocorrelation curve 76 for the signal pulses with the prisms 70 adjusted for near-zero net intracavity group velocity dispersion at a wavelength of 0.84 micrometers. In FIG. 4, curve 78 illustrates the spectrum of the signal pulse while FIG. 5 illustrates an interferometric autocorrelation of the signal pulses. The signal pulse width indicated by the autocorrelation data is 105 femtoseconds (fit to $sech^2$), which is one half of that available in the absence of the prisms 70, using the same pump pulse width of 170 femtoseconds. The signal pulse time-bandwidth product of about 0.35 indicates transform-limited pulses in the OPO, and this is substantiated by the highly symmetric spectrum of FIG. 4 and the autocorrelation curves of FIG. 5. It was found that the OPO pulse width of 105 femtoseconds could be obtained with pump pulses at least as long as 350 femtoseconds, suggesting that the signal pulse width is limited primarily by group delay between signal and pump pulses in the crystal 12. The signal power output with the prisms in the cavity was the same as that obtained in the absence of the prisms, indicating that the loss due to the insertion of the prisms was fully compensated by an increase in gain resulting from improved confinement of the signal pulse within the gain window defined by the pump in the crystal.

Figure 6:
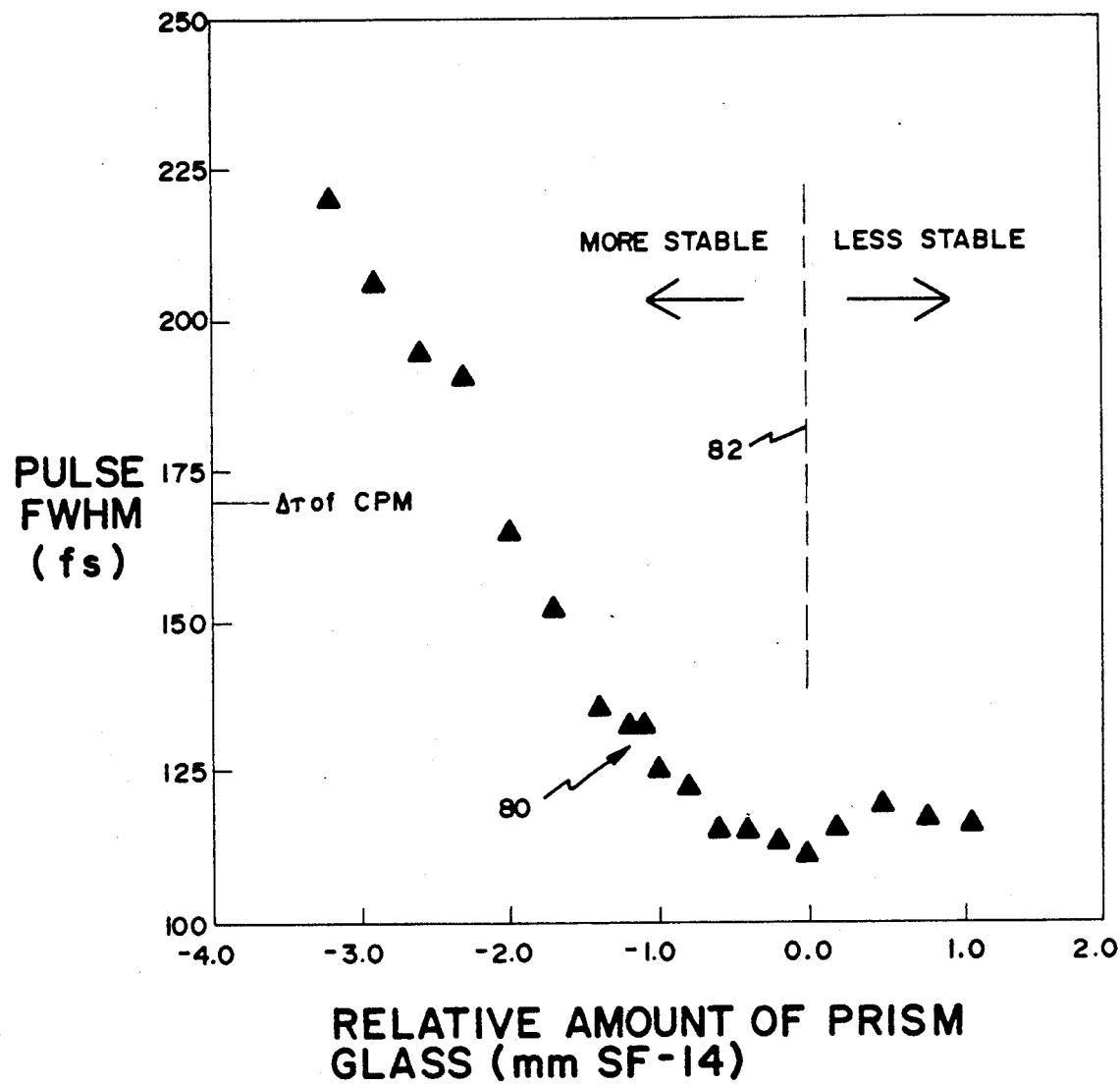
FIG. 6 is a graphical illustration of the variations in signal pulse width in the OPO of FIG. 1 with variations in the amount of prism glass in the cavity.

The variation of the pulse width of OPO 24 with changes in the thickness of the prism glass, measured at 0.84 micrometers wavelength, is depicted in FIG. 6 by the data points generally indicated at 80. These measurements were taken with a pump pulse width of 170 femtoseconds and as illustrated, as the amount of glass is adjusted from that which provides a near-0 intracavity group velocity dispersion, indicated at vertical line 82, the pulse width is varied. With excess negative group velocity dispersion produced by reducing the relative amount of prism glass, the width of the pulses increases, and stable operation was obtained with pulse widths up to 220 femtoseconds. Since there is no gain storage, however, the maximum OPO pulse width that can be obtained is set by the pump pulse width and the broadening arising from signal-pump group delay.

To obtain the shortest possible pulses, the requirements for length stability of the cavity 24 are exceedingly stringent, for pulse formation is sensitive to changes in the cavity length of about 10 nm, although oscillation persists for length mismatches greater than this. Pulses broaden when the cavity is too long, and become noisy when it is too short. Although the performance of the oscillator 24 is sufficiently stable to oscillate over a period of hours, it has been found that in typical operating conditions, acoustic noise and changes in ambient room conditions can result in detectable fluctuations in the signal autocorrelation trace as well as a steady, long term drift of the OPO output. To minimize these effects, the length of the OPO cavity is stabilized by means of the transducer mounting 58 for mirror 54. Stabilization is obtained by leaking a small portion of the OPO light through the cavity mirror 54 and along path 80 to a grating 82. The light is reflected from the surface of the grating and forms a spectrum generally indicated by the dotted line 84. Spaced photodiodes 86 and 88 are positioned at either side of the spectral peak to sense changes in the light intensity as the spectrum changes. The outputs of the two diodes are supplied by way of lines 90 and 92 to a feedback circuit 94, where the difference between these two signals, which is typically set near zero, is determined. Circuit 94 also compares the difference signal to an adjustable bias voltage supplied by way of line 96 to obtain an error signal, and this signal is supplied through a high gain amplifier 98, and by Way of line 100 to the driver of the piezoelectric transducer 58. When changes in the length of cavity 24 result in a monotonic shift of the spectrum 84, the outputs of the diodes 86 and 88 will vary and the difference between these signals and the preset bias will result in an amplified error signal on line 100. This output error signal for the feedback loop changes the energization of the piezoelectric transducer, thereby shifting the location of mirror 54 and changing the length of the cavity to restore the wavelength of the oscillator signal.

Figure 7B:
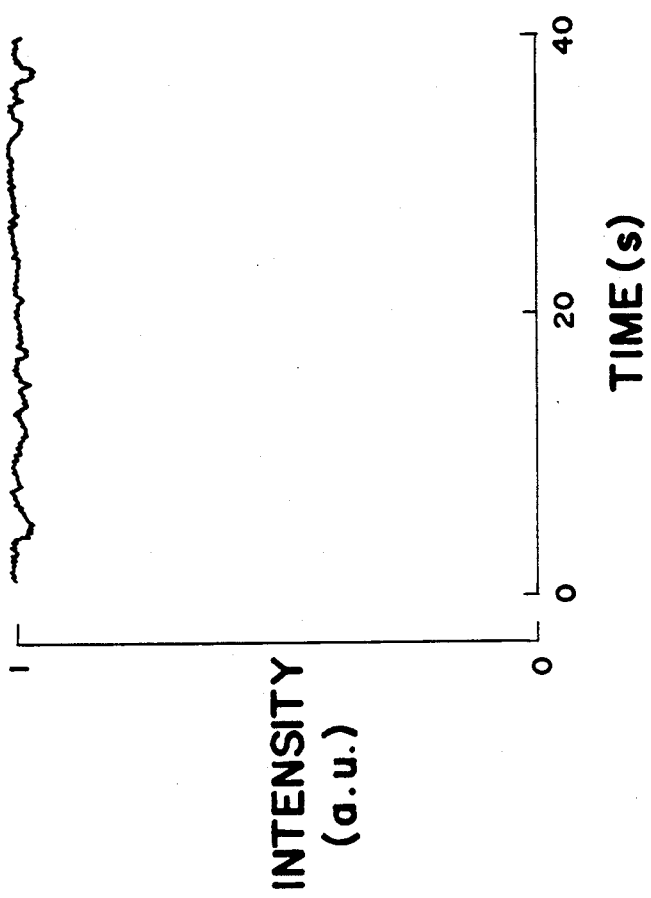
FIG. 7b is a graphical illustration of the device of FIG. 7a with stabilization.
Figure 7A:
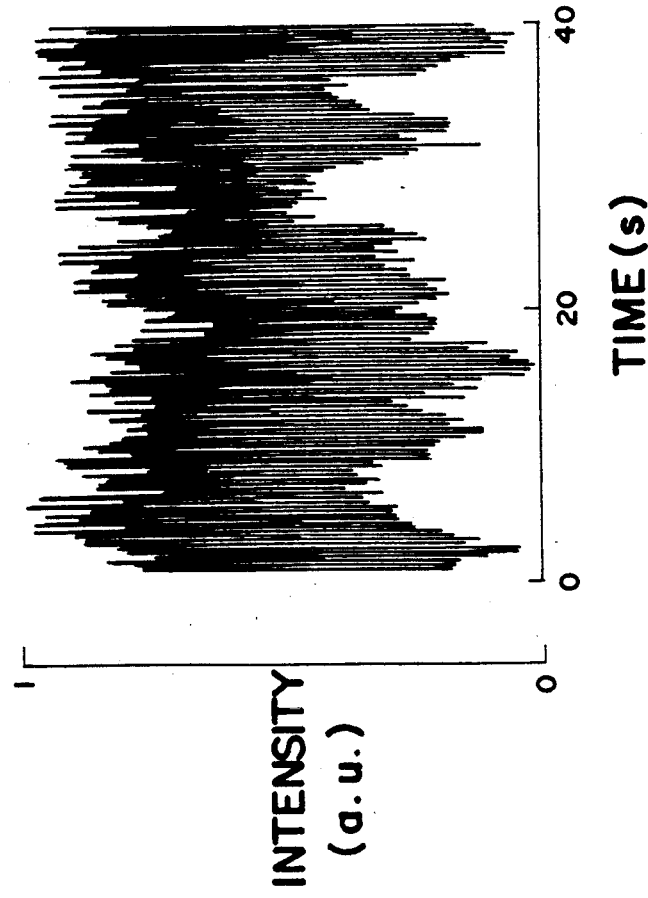
FIG. 7a is a graph illustrating the signal output power with a transducer vibrating at 30 Hertz in contact with one of OPO mirror mounts without stabilization of the cavity.

To demonstrate the operation of the stabilization circuitry, the OPO was operated in its normal manner. Initially it was quiet with its noise power spectra following that of the CPM laser, with levels under −80 dB for frequencies above about 10 Hz. Over periods of ten minutes or more, however, with the feedback circuit switched off, the cavity was unstabilized and drifted so that its output became increasingly noisy. Turning the feedback circuit back on effectively eliminated this instability. To demonstrate the operation of the feedback circuit, noise was added to the OPO cavity 24, as by perturbing one of the OPO mirror mounts with a transducer driven at 30 Hz. FIG. 7a illustrates the signal power output with the transducer in operation, illustrating large variations in intensity of the output light over a period of time. FIG. 7b shows the signal power output variations in the presence of stabilization provided by the feedback circuit. This stabilization limits the fluctuations in the output so that the application of the noise by operation of the transducer on the mirror increases fluctuations only 2 or 3%, as compared to the conditions without the disturbance.

The foregoing examples demonstrate the tuning of both signal and idler beams in an OPO from 0.82 to 0.92 micrometers and from 1.90 to 2.54 micrometers in signal and idler beams, respectively, for a single set of mirrors. Additional mirrors for different wavelengths are readily available commercially, and accordingly, with several KTP crystals and mirror sets, the entire tuning range of the OPO device from about 0.72 micrometers to about 4.50 micrometers is readily obtainable. However, since the group delay is wavelength-dependent, the pulse shape and its transform-limited pulse width will vary with wavelength. In the region where the group delay is largest, from 1.5 to 2.0 micrometers, the measured bandwidth of idler spectra indicate an upper transform limit of about 300 femtoseconds.

Thus there has been described a continuous wave modelocked optical parametric oscillator which is singly resonant and which produces the most broadly tunable output obtainable directly from a femtosecond laser. The tuning range of the device covers spectral regions that have previously been inaccessible, particularly with pulses of the width here available and the high repetition rate, stability, beam spatial quality and available power levels provide a unique and versatile femtosecond laser source. Although the present invention has been described in terms of preferred embodiments, it will be apparent that numerous variations and modifications may be made without departing from the true spirit and scope thereof as set forth in the following claims.

What is claimed is:

1. A broadly tunable optical parametric oscillator, comprising:
    a first oscillator ring cavity having a closed path which includes means defining an intracavity focus;
    a thin crystal of KTiOPO$_4$ located in said first ring cavity at said intracavity focus, said crystal being cut for type II phase matching at normal light incidence;
    a laser pumping source producing an output light beam; and
    pump means directing said pumping source output light beam onto a surface of said crystal to stimulate oscillation in said first oscillator ring cavity, wherein said pump means comprises a second ring cavity including second means defining an intracavity focus for said second cavity, said crystal being also located in said second cavity intracavity focus.

2. The oscillator of claim 1, wherein said laser pumping source output beam comprises high repetition rate femtosecond pulses which stimulate femtosecond pulses in said first oscillator ring cavity at wavelengths in the near to mid infrared range.

3. The oscillator of claim 1, wherein said pumping source output beam comprises femtosecond pumping pulses to synchronously pump said crystal to stimulate corresponding femtosecond pulses of light, which pulses propagate in said first oscillator ring cavity.

4. The oscillator of claim 3, wherein said pumping source is a Rhodamine 6G colliding-pulse passively mode-locked dye laser, and wherein said crystal responds to said pumping pulses to produce oscillation wavelengths in the near- to mid- infrared range in said first oscillator ring cavity.

5. The oscillator of claim 4, wherein said first oscillator ring cavity further includes prism means for adjusting the width of pulses propagating in said ring cavity.

6. The oscillator of claim 5, wherein said first oscillator ring cavity further includes at least one flat mirror and transducer means supporting said flat mirror for adjusting the length of said first cavity.

7. The oscillator of claim 6, further including feedback means responsive to pulses propagating in said ring cavity and connected to said transducer for adjusting the length of said cavity.

8. The oscillator of claim 1, wherein said first means defining said first intracavity focus comprises a pair of curved mirrors selected to focus predetermined wavelengths in said first ring cavity to produce oscillation wavelengths in the range of about 0.72 to about 4.5 micrometers.

9. The oscillator of claim 1, further including means mounting said crystal for rotation about an axis perpendicular to said pumping source output beam, whereby rotation of said crystal tunes said oscillation.

10. A broadly tunable optical parametric oscillator, comprising:
    a first oscillator ring cavity having a closed path which includes a first pair of curved mirrors defining an intracavity focus;
    a thin crystal of KTiOPO$_4$ mounted for rotation in said first ring cavity at said intracavity focus, said crystal being cut for type II phase matching at normal light incidence;

a laser pumping source producing an output light beam;

means including a second ring cavity directing said pumping source output light beam onto a surface of said crystal to stimulate oscillation in said first oscillator ring cavity, said second ring cavity including a second pair of curved mirrors defining a second intracavity focus, said crystal being also located in said second intracavity focus and being rotatable about an axis perpendicular to the pumping source output beam incident on said crystal, whereby rotation of said crystal tunes said oscillation.

11. The oscillator of claim 10, wherein said pumping source output beam comprises femtosecond pumping pulses to synchronously pump said crystal to stimulate corresponding femtosecond pulses in said first oscillator ring cavity.

12. The oscillator of claim 11, wherein the reflectivity of said curved mirrors in said first oscillator ring cavity are selected to provide tunability of said oscillator through the near and mid infrared wavelengths.

13. The oscillator of claim 12, wherein said crystal is about 1.4 mm thick.

14. The oscillator of claim 12, wherein said crystal includes an antireflection coating.

15. The oscillator of claim 12, wherein said crystal produces signal and idler beam pulses in response to said pumping beam source output beam pulses, and wherein said first ring cavity propagates said signal beam pulses.

16. The oscillator of claim 15, wherein the angle between said pumping source output beam and said signal beam within said crystal is less than about 2°.

17. The oscillator of claim 16, further including prism means within first oscillator ring cavity to compensate for variations in the width of said signal beam pulses.

18. The oscillator of claim 17, wherein said pumping source output beam pulses have a width of about 170 femtoseconds, to produce oscillator signal beam pulses having a width of about 105 femtoseconds.

19. The oscillator of claim 18 wherein said first oscillator ring cavity further includes at least one flat mirror partially transmissive to said oscillator signal beam pulses to produce an oscillator output light beam having high repetition rate femtosecond pulses of light in the near to mid infrared range.

20. A synchronously pumped broadly tunable parametric oscillator for producing femtosecond light pulses in the infrared wavelength and band and at a high repetition rate, comprising:

a first ring cavity having a first closed path which includes first means defining a first intracavity focus;

a second ring cavity having a second closed path which includes second means defining a second intracavity focus;

a thin crystal of $KTiOPO_4$ located in both said first cavity at said first intracavity focus and said second cavity at said second intracavity focus;

a laser pumping source producing a beam of femtosecond pumping pulses;

means directing said pumping pulses into said second ring cavity, whereby said pumping pulses propagate in said second ring cavity and are incident on said crystal to synchronously pump said crystal to thereby stimulate said crystal to produce corresponding femtosecond output pulses in the infrared wavelength band which propagate in said first cavity; and output means in said first cavity for emitting at least a portion of said femtosecond output pulses.

21. The oscillator of claim 20, further including prism means in said first cavity for adjusting the width of said output pulses propagating therein and feedback means for adjusting the length of said first cavity.

22. The oscillator of claim 21, wherein said crystal is mounted for rotation about an axis perpendicular to said pumping pulses, whereby rotation of said crystal tunes said oscillation.

* * * * *